April 13, 1937. T. J. SMULSKI 2,076,678
ELECTROTHERMAL INDICATING APPARATUS
Original Filed April 21, 1930    2 Sheets-Sheet 1
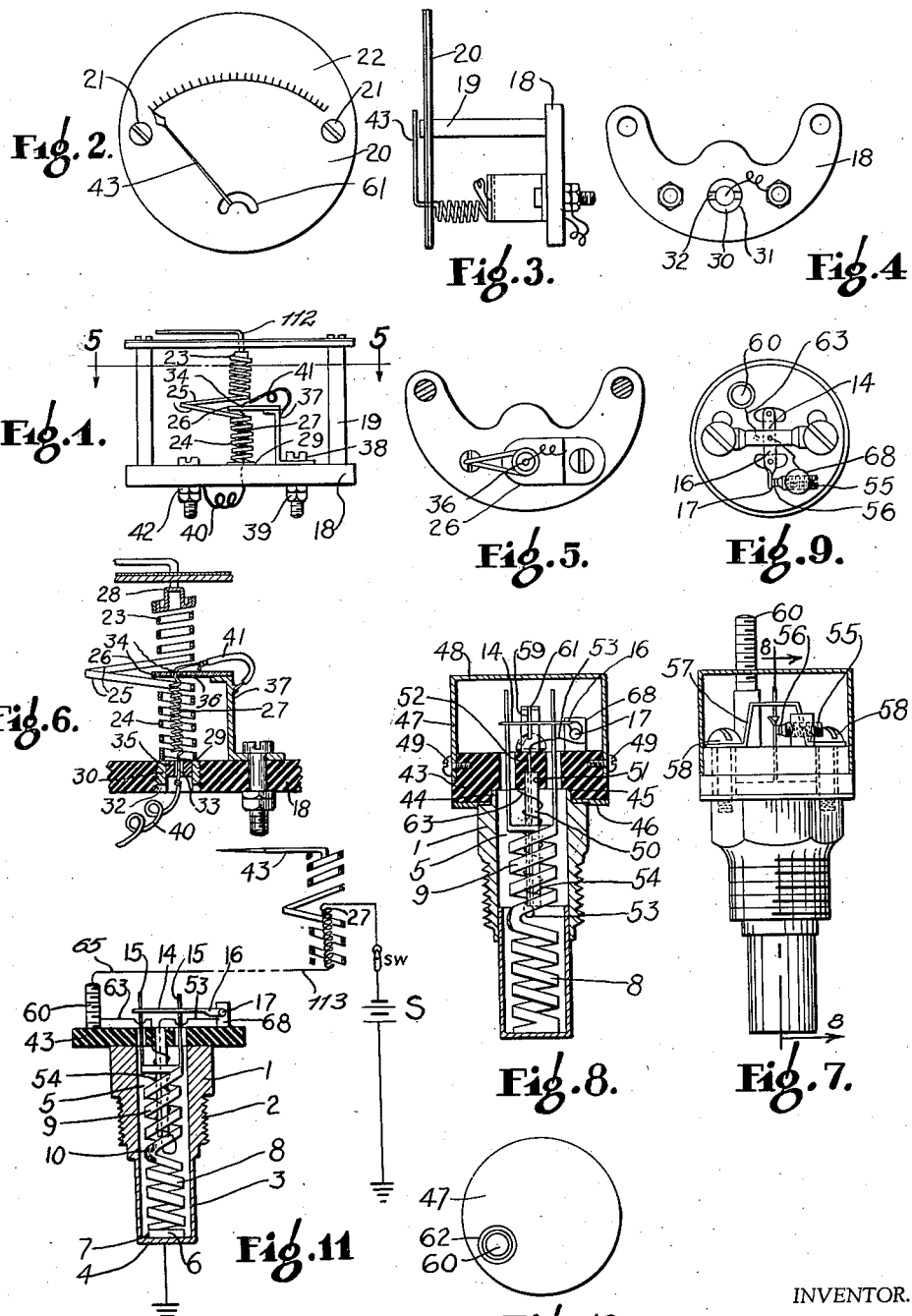
INVENTOR.
Theodore J. Smulski.
BY Slaugh and Canfield
ATTORNEY.

April 13, 1937. T. J. SMULSKI 2,076,678
ELECTROTHERMAL INDICATING APPARATUS
Original Filed April 21, 1930  2 Sheets-Sheet 2

INVENTOR.
Theodore J. Smulski.
BY
ATTORNEY.

Patented Apr. 13, 1937

2,076,678

UNITED STATES PATENT OFFICE 2,076,678

ELECTROTHERMAL INDICATING APPARATUS

Theodore J. Smulski, Gary, Ind., assignor to The Anderson Company, Gary, Ind., a corporation of Indiana Original application April 21, 1930, Serial No. 445,994. Divided and this application August 26, 1935, Serial No. 37,875

10 Claims. (Cl. 171—271)

My invention relates to electro-thermal apparatus and relates particularly to electro-thermal apparatus adapted for operation in pairs comprising a controlled and control apparatus for any useful purpose wherein simultaneous commensurable operation of a controlling and controlled apparatus is required.

The apparatus of my invention is directed particularly to controlled apparatus, such as apparatus for indicating a physical condition, as temperature, and is divisional of my co-pending application Serial No. 445,994, filed April 21, 1930, for Electro-thermostatic apparatus, the apparatus of my co-pending application being directed primarily to controlling apparatus.

It is an object of my present invention to provide improved, efficient controlled apparatus operable simultaneously and commensurably to controlling apparatus to indicate a physical condition.

Another object of my invention is to provide an improved indicating apparatus for receiving electrical impulses from a controlling apparatus, the impulses being telegraphed thereto commensurably to the temperature of a body with which the controlling apparatus is associated.

Another object of my invention is to provide an improved electro-thermal apparatus wherein the thermal properties of the apparatus may be efficiently predetermined in quantity production of the apparatus.

Another object of my invention is to provide improved apparatus for indicating temperatures remotely from the manifestation of the temperature effect to be indicated.

Other objects of my invention and the invention itself will become increasingly apparent from a consideration of the following description and drawings, wherein:

Fig. 1 is a side elevational view of an indicator mechanism which may be advantageously employed in said system embodying my invention;

Fig. 2 is a plan view of the mechanism of Fig. 1, the view showing the indicator dial and movable hand therefor;

Fig. 3 is a side elevational view of the indicating mechanism of Fig. 1, taken from a right angle position relative to Fig. 1;

Fig. 4 is a bottom plan view of an insulating mounting plate for the said indicator mechanism;

Fig. 5 is a section taken along the line 5—5 of Fig. 1;

Fig. 6 is a longitudinal medial sectional view of a compensated thermostat mechanism and heating element therefor, together with associated parts relating to the indicating apparatus of Figs. 1 to 5 inclusive;

Fig. 7 is an elevational view partially in section of a controlling apparatus embodying the principle of my invention;

Fig. 8 is a longitudinal medial sectional view of the apparatus of Fig. 7 taken along the line 8—8;

Fig. 9 is an end elevational view of the controlling apparatus of Fig. 7, with the cover cap therefor removed;

Fig. 10 is a top plan view of the apparatus of Fig. 7 with the cover cap in position;

Fig. 11 is a diagrammatic view of the controlling and controlled apparatus of the foregoing figures, and an operative electrical system in which such apparatus is included;

Figure 12:
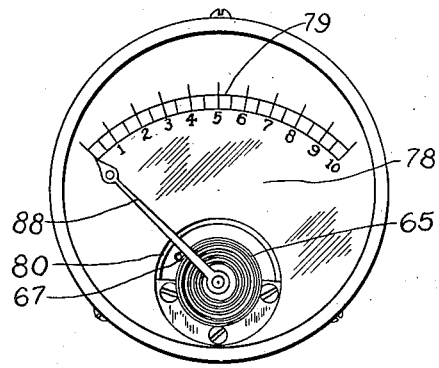
Figs. 12 and 13 are front elevational and longitudinal medial sectional views, respectively, of an indicating apparatus which is another embodiment of my invention.
Figure 13:
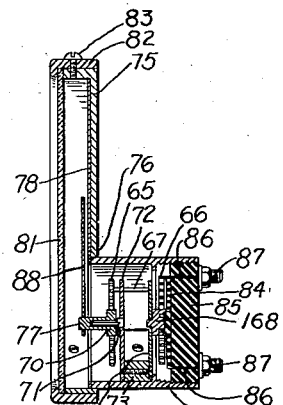

Referring now to Figs. 1 to 6, inclusive, in which a form of the indicating mechanism of the system is illustrated, the parts shown may be mounted on a mounting plate 18 of insulating material. A pair of posts 19 secured to and extending in parallel relation from the support 18 carry a dial plate 20 secured to the posts by screws 21. The dial plate, preferably, is marked with dial indicia 22, some of the spaced marked divisions thereof being provided with numerals, which may, for instance, refer to degrees of temperature, Fahrenheit. The pointer hand 43 is supported by a thermostat comprising a pair of reversely coiled helices 23 and 24, which are integrally joined together by the contiguous ends 25 of the helices disposed in the form of a loop.

The two helices are axially aligned and preferably longitudinally spaced with a baffle plate 26 of heat insulating material, preferably disposed between the two to restrain the flow of heated air from the helix 24 to the helix 23, and from the heating element 27 which is axially disposed within the helix 24 for the purpose of heating it when the device is in operation as later herein described.

The baffle plate 26 is supported on a bracket 37 which is rigidly secured on the insulating base 18 by a screw 38 projected through the base of said bracket and said plate. The nuts 39 on the outermost end of the screw 38 provide a binding post for making connection by circuit conductors with the screw 38 and therefore with the bracket 37 to which a terminal of the heating element 27 is permanently connected.

The pointer 43 is secured to the outermost coil of the helix 23 in any suitable manner, such as by soldering the disk 28 to the center of which the pointer 43 is affixed, to the outermost convolution of the helix, or by effecting a frictional engagement therebetween. The hand 43 is joined to the disk 28 by a short arm 112 of the hand projected through an arcuate opening 61 of the dial plate. The remote end of the helix 24 terminates in a convolution 29, preferably formed as an annulus and rigidly affixed to a hollow screw 30 which is screwthreaded within the bore 31 of the insulating supporting plate 18. The screw 31 may have a screw driver receiving slot as shown at 32.

The heating element 27 is axially suspended within the helix 24, being in the form of a resistance wire helix and is maintained in position by its leading-in wires 33 and 34 projected through the axial bore of a bored insulating plug 35 and an axially disposed aperture 36 of the baffle plate 26.

A preferably copper circuit conductor 40 of substantial gauge and a like circuit conductor 41 are joined to the leading-in wires 33 and 34, respectively, and are connected to the similar binding posts 42 and 39, respectively, the latter through the bracket 37 to which the conductor 41 is preferably connected.

From the foregoing description, it will be understood that the helices 23 and 24 being oppositely wound and alike in the number of their convolutions and other dimensional characteristics and each being formed of a ribbon of bi-metallic material, upon changes of temperature will tend to wind or unwind, in a manner well known for such helices, but in opposite directions and to the same degree, whereby for all ambient temperatures, any tendencies toward rotative movement of the hand 43 resulting from such changes of temperature will be thoroughly compensated, each of the helices compensating for the other.

However, only the helix 24 is exposed to the effect of electrical heating, being provided with the electrical heating element 27 axially telescoped within it, and heat therefrom substantially being prevented as by the guard 26 from reaching the helix 23. When the heating element 27 is energized, the helix will tend to unwind to produce a rotative movement of its arm 25 and therefore of the carried helix 23 which supports the hand supporting disk 28. As a result of this electrical heating action, the hand 43 will advance along the scale 22 toward the right from its starting position at the left side of the dial.

In calibrating the instrument, should it be found that the heating helix 27 produces more than the predetermined amount of heat, and therefore deflects the needle 43 to an excessive degree, the portion of the helix 27 disposed within the thermostat helix 24 may be reduced by grasping the circuit conductor 40 with a suitable tool and pulling the leading-in wire 33 to draw some of the wire of the heating element 27 into and/or through the bore of the insulating plug 35 to reduce the length of the heating element disposed within the thermostat helix. Such an adjustment may be employed where great accuracy is required and as a final adjustment.

The helix 27 is preferably wound with considerable closeness between the successive convolutions which are of a small diametrical dimension so that the mass of the heating element per cubic inch of space occupied is relatively large. This arrangement is conducive to the provision of a substantial amount of heat storage capacity in the helix 27, whereby the helix will not rapidly lose its heat between impulses of heating electrical current directed through the helix.

Figure 21:
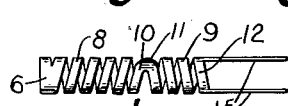
Fig. 21 is a side elevational view of an operative element of the apparatus of Fig. 11.

Referring now to the controller of Figs. 7 to 11 inclusive, and Fig. 21, the controller, preferably, provides a metal tubular heat conducting support having a hexagonal head 1, a reduced intermediate portion 2 and a longitudinally extending tubular tip 3 having an integral end closure 4. The bore 5 of the support extends axially therethrough and is of such a diameter as to receive the double thermostatic element of Fig. 21 telescoped preferably axially therein with its annular end 6 integrally united as by solder 7 to the metal end 4 of the support with the outer surfaces of its convolutions disposed in substantial air spaced relation to the inner walls of the tubular support.

The helical thermostat is formed of a strip of thermostatic bi-metallic material, the one section of which comprises a metallic strip of a metal having a different coefficient of thermal expansion than the second section which is integrally secured to the first section.

The composite strip thus formed is given the form of a helix having longitudinally aligned sections, each section of which is reversely wound relative to the direction of winding of the other.

One of the sections, namely the section 8 terminating in the annulus 6, as above stated, is relatively longer, contains more convolutions, and the total length of bi-metallic strip forming said convolutions is greater than the number of convolutions and the aggregate length of the convolutions of section 9, for a purpose later explained. The sections are integrally joined together by a substantially U-shaped portion of the strip shown at 10, which is stiffened against bending by providing it with an out-turned tip 11, see especially Fig. 21.

To the end convolution 12 of the shorter thermostat section 9, formed as described, a pair of diametrically oppositely disposed prongs 15 are preferably provided to which, as shown in Figs. 7, 8, 9, and 11, a metallic cross arm 14 is soldered and projects laterally to one side of the two prongs to terminate in a contact carrying arm 16 supporting an electrical contact element 17.

Prior to placement of the cross arm 14 on the prongs, a disk 43 of preferably electrical and heat insulating material is affixed to the hexagonal head 1 of the tubular support by the provision of a tubular flange 44 whose bore is of the same diameter as the bore 5, projecting integrally from said head and terminating in a slightly outturned end 45. Forced into the material of the insulating disk 43 is preferably a metal washer 46 fitted over the flange 44. Prior to expanding its end 44 to the form shown, the disk 43 is circumferentially relieved near its outer end for the reception of the lateral cylindrical walls 47 of a cover cap 48 telescoped over the outer surface of the said relieved disk portion. Suitable means, such as the screws 49, may project through suitable apertures of the walls 47 into suitably placed threaded recesses of the disk 43 to rigidly secure the cap 48 on the disk.

Supported on the inner face of the disk 43 I provide a tube 50 of glass or other heat resistant material secured to the disk by press fitting its end 51 into a centrally disposed recess of the inner wall of the disk. In longitudinal alignment and communicating with the bore of the glass tube 50 I provide a passage 52 extending from the bore of the tube 50 to the opposite surface of the disk for the reception of an electrical circuit conductor 53 projected through said passage 52 and through the longitudinal bore of the glass tube 50 to its free end where the conductor 53 is reversely turned and connects, integrally or otherwise, with the heat producing electrical circuit conductor 54, helically wrapped from the free end of the tube 50 toward its fixed end on its outer surface.

The glass tube 50 is of such reduced diameter relative to the internal bore of the shorter helix 9, as to be substantially air spaced therefrom along the length of the tube, and therefore the length of the heating element winding 54 wrapped about the tube 50, is preferably somewhat less than the length of the helix 9. In preparing the helices 8 and 9, I preferably make the innermost material that which has the greatest coefficient of thermal expansion.

An affixed contact support 68, in the form of a metal post, is mounted on the outer surface of the disk 43, said post, preferably, projecting into the material of the disk by a stem portion, not shown. The post supports a contact screw 55, screw-threaded transversely through it, said screw being provided with a tip contact 56, on its end adapted for engagement with the movable contact 17 carried by the contact arm 16. By turning the screw 55 the fixed contact 56 may be adjusted relative to a given position of the movable contact 17 so as to vary the rotative position of engagement between said contacts.

A bridge 57 secured at its ends to the disk 43 by screws 58 overlies the center of the disk, and also the cross arm 14. The cross arm 14 carries a pinion rod 59, disposed in axial alignment with the axis of the helices 8 and 9, which projects through a journal opening 61 extending centrally through the bridge 57.

In this manner, the helices 8 and 9 and the contact carrying arm 16 are held in proper position relative to the axis of the device, the cross-arm 14, which terminates in the contact arm 17 rotating on the pinion 59 centrally journalled in the bridge 57, to rotatably move its carrying contact 17 on a given radius toward and away from the fixed contact 56 adapted for engagement thereby.

A binding post 60 is rigidly mounted in the insulating material of the disk 43, and projects from its outer face through an aperture 62 of the cover cap 47, but escaping contact therewith by reason of the relatively large size of the aperture 62. The upper end of the electrical heating resistance helix 54 joins with a circuit conductor 63, which is electrically connected to the binding post 60.

The operation of the controller, above described, will be readily understood by reference to the figures described and by collateral reference to Fig. 11, showing diagrammatically an electrical system in which the indicator apparatus of Figs. 1 to 6 is shown as included, and operable under the control of the described controller. The system and apparatus operate as follows: It being understood that the tubular support is screw-threaded by its exteriorly threaded intermediate portion 2 into a wall of a fluid conduit, the variable temperature of the fluid contained therein being that variable factor, the quantitative values of which are desired to be indicated remotely of the controller at the indicator having the indicating hand or needle 43, with the closed tubular end 3 projecting into said fluid.

For example, it may be assumed that the tubular end 3 is thus projected into the cooling water of an automotive engine water cooling jacket and the temperature of such water is thermally conducted by the end wall 4 of the tube to the annular end 6 of the bi-metal helix 8, which is thereby heated to a temperature approximately that of the temperature of water in the jacket.

The temperature of the water or other fluid in contact with the tip 3 of the support is communicated to the interior thereof and will heat the helices 8 and 9. The helix 8 is provided with a greater length of bi-metallic strip material than the helix 9 and when heated to the same temperature as the helix 9 will effect a greater rotary movement of its end 10 in one direction than will be effected by the helix 9 upon the prongs 15 carried at its free end, and since the prongs 15 are carried by the free end of the helix 9, the combined opposite rotary effects of heating the helices 8 and 9 simultaneously will be to move the prongs 15 in a rotary path about the axis of the helices 8 and 9 an amount which represents the amount of rotary movement of the end 10 of the helix 8, which is in excess of that effected by the helix 9 upon the prongs 15.

Therefore, by the excess of rotary movement effected by the helix 8, the prongs 15 will be moved to carry the contact carrying arm 16 to move the contact 17 in a rotary path to effect engagement between the contact 17 and the fixed contact 56, which is mounted on a post 68. Since engagement is had between the contacts 56—17, an electrical circuit is closed which in the embodiment of Fig. 11 may be traced from the source of current S, such as a storage battery through the closed switch SW, the indicator heating element 27, circuit conductor 113, the connector post 60, the conductor 63, the controller heating element 54, the conductor 53, the supporting post 68, the contacts 56—17, now in engagement, the arms 16 and 14, the prongs 15, the integrally joined helices 8 and 9 and thence through the grounded frame of the water jacket supporting the tubular support by its portion 2 to the grounded pole of the source of current S.

Current flowing over the circuit just traced, will effect simultaneous heating of the elements 27 and 54, at the indicator and controller, respectively, to cause a rotative movement, respectively, of the indicator hand 43, and the contact carrying arm 16. By supplying additional heat from the heating element 54, principally to the helix 9 and largely excluding the communication of heat therefrom, the helix 8 will cause the helix 9, although helix 9 is of shorter length and contains fewer convolutions and therefore is less responsive than the helix 8 when they are at the same temperature, to respond additionally because of its increased temperature to move the prongs 15 in the opposite direction to that above described, in other words in a clockwise direction, as viewed in Fig. 9, until the contacts 17 and 56 are separated. Separation of these contacts will not occur until the heating element and the helix 9, taken together, have accumulated sufficient heat, so that the ultimate temperature effected by the helix 9 is sufficient to cause it to respond thermostatically to move its free end sufficiently to break the contacts. An appreciable period of heating is thereby effected and in addition, even after the instant when the contacts 17—56 are broken, heat will continue to be supplied to the helix 9 from the heated element 54 even though it has started to lose some of its heat, so that the contacts 17—56 will be separated an appreciable distance, until the communication of heat to the helix 9 has become discontinued.

Since the circuit is thus broken, however, cooling of the heating element 9 will be effected gradually until the heat electrically effected in the helix 9 will produce a lesser rotative effect than that produced in the helix 8 by heat received from the fluid, and the contacts 17—56 will be reclosed.

This operation will be periodically continuous and will effect a periodic closure of the contacts and resultant periodic flows of current through the two heating elements, which will be thus supplied with increments of heat periodically and simultaneously.

Both heating elements are so disposed and with their associated parts possess a sufficient ability to store heat, only partially lost during non-heating periods, whereby neither the electrically heated controlling helix 9 nor controlled helix 24 is greatly cooled during non-heating periods.

As a result the indicator hand 43 having taken a given position on its associate scale will oscillate but slightly from such position and the mass and material composing said heating element and its associated parts relative to the radiating surface thereof is made such that it may be heated in a sufficiently short time to effect an indicator hand movement to indicate a given temperature telegraphed from the controller and will substantially maintain such indication while the current over the electrical circuit is commutated periodically by the contacts 17—56.

The adjustment screw 55 for the controller may be rotated to longitudinally move its carried contact 56 to vary the heat supplied to the helix 9 by the heating element 54 required to effect disengagement of the contacts 17 and 56, whereby the heating value of the current supplied to the indicating unit for a given ambient temperature is varied and consequently the position of the hand 43 is correspondingly moved. The glass tube 50 may be spirally grooved to receive in such groove the electrical resistance wire 54 to predetermine its length and position, or any other suitable means may be provided to insure this effect.

It will be understood that, since the helix 9 of the controller is shorter than the helix 8, more heat will be required to be supplied to it by the electrical circuit conductor 54 than the heat supplied to the helix 8 to accomplish a given movement of the contact 17. Also, heat from the fluid will be transmitted to a considerable extent to the helix 9, as well as the helix 8, subtracting by its effect on the helix 9, from the primary actuating movement effected on the contact 17 by heating of the helix 8.

The helix 8, however, is given a sufficiently greater number of turns, so as to overcome this mechanical handicap when heated by the fluid, so that actuation of the contacts is assured.

The electrical heating element 54 supplies sufficient heat to the helix 9, additional to that supplied from the fluid medium, so that the helix 9 becoming hotter than the helix 8 and maintained at a greater temperature, while the heating element 54 is heated, insures that the contact 17 may be moved from engagement with the contact 56 after heating of the element 54 has progressed for a predetermined short time, during each heating period.

It will be understood that for greater values of temperature of the liquid in the water jacket, or other fluid medium, the total length of heating periods in a given time, relative to non-heating periods, will be commensurably increased, so that the total amount of heat supplied to the heating element 27 in a given short time, that is the rate of heating of the element 27, will be increased.

It will be understood, also, that the indicator hand 43 will take variable positions commensurable with the intensity of the heat during each heating period and the length of such heating period, and the relative length of heating periods to non-heating periods, that is to the rate of heating.

Referring now to Figs. 12 to 15, inclusive, which show an indicator mechanism which is another embodiment of my invention, operating substantially like that shown in Figs. 1 to 6, inclusive. In this embodiment, a pair of longitudinally aligned and spaced spirally formed thermostat elements 65 and 66 are provided, joined together by a yoke 67 uniting their outer ends. The central portion of the spiral 66 is rigidly secured to a fixed hub 168 adjustably rotatable in a heat insulating support 69, and the central portion of the spiral 65 carries a hub 70, which is rotatably journalled on a journal pin 71 rigidly carried on a second support 72, which is preferably spaced from the support 69, both being preferably secured to opposite sides of a spacer 73.

The indicator apparatus, so far described, is secured by its supporting spacer element 73 to a lateral wall of a tube 74, which in turn is carried by an end wall of a preferably metallic shallow cup 75, apertured at 76 to receive the end of the tube 74, which is rigidly secured to the cup end wall by making a press fit therewith and/or by soldering the contiguous surfaces of the tube and cup end wall. The hub 70 projects by a reduced end 77 into the cup 75, the inner surface of whose end wall is provided with dial containing facing 78, having suitable dial scale divisions and indicating indicia therefor, shown at 79, said face being suitably apertured, as at 80, whereby the hub 70 may project therethrough.

A dial glass 81 is carried on the rim of the cup 75 and held in place by an inwardly flanged tubular clamping annulus 82 held in place by screws 83. An electrical heating element consisting of a grid 84 of resistance wire, is carried on the inner face of a plug 85, screwthreaded into the end of the tube 74, being bored to permit the terminal conductors 86 of the heating element to project to the outer face of the plug for connection to suitable electrical terminals 87, as shown.

The air spacing between the heating element grid 84, and the adjacent spiral 66 is susceptible of adjustment by rotation of the plug 85 to longitudinally displace it within the tube 74. The spirals 65 and 66 are wound in opposite directions so that upon all ambient temperature conditions communicated alike to the two spirals, each will tend to effect a rotary movement to the hub 77 but in opposite directions, and both being of the same length to the same degree to neutralize or to compensate each other for ambient temperatures.

Upon the heating element 84 being energized by flow of current therethrough under conditions, for instance like that shown in Fig. 11, for the heating element 27, the inner surfaces of the convolutions of the bi-metallic convolutions of the spiral 66 being of the more expansible material, rotation of the hub 77 carrying the indicator hand 88 will be effected to move the point of the hand over the scale 79 toward the right. The apparatus, as described, is provided for the same purposes and operates in the same manner as described in the embodiment for Figs. 1 to 6, inclusive.

Figure 14:
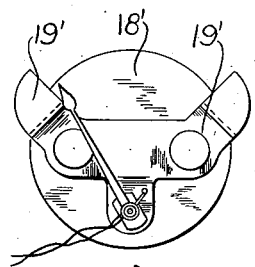
Figs. 14 and 15 are front elevational and longitudinal medial sectional views, respectively, of a further modification of my invention, with the front dial plate and casing removed.
Figure 15:
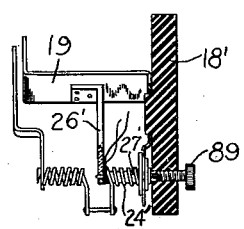

In the embodiment of Figs. 14 and 15, a modification from that shown in Figs. 1 to 6, inclusive, is shown, whereby the heating element 27' telescoped within the helix 24' is susceptible of being longitudinally adjusted by an adjusting screw 89 screwthreaded in an opening of the insulating base 18', and therefore, movable longitudinally by rotating it. In this embodiment, the heating element 27' includes a rod of glass or like material supported between the end of the screw and the resilient heat insulating guard 26'.

From the above description, it will be understood that rotation of the screw 89 will longitudinally displace the heating element relative to the convolutions of the thermostatic helix 24', and therefore vary the amount of heat communicated from the heat element to the convolutions of said helix.

This provides a manufacturing adjustment which may be substituted for the expedient of drawing some of the wire of the heating element, such as 27, Fig. 3, from the helix. In this embodiment, also, a sheet metal frame is provided for supporting the relative parts of the mechanism on the base 18', said frame comprising standards 19' adapted to support a dial plate, as that shown at 20, Figs. 3, 4, and 6, instead of the posts 19 shown in Figs. 3 and 4.

Figures 16, 17, 18:
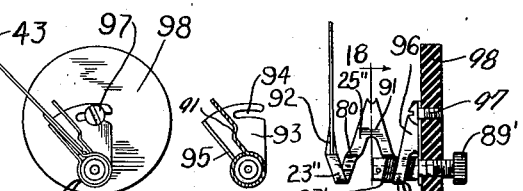
Figs. 16 and 17 are views similar to Figs. 14 and 15 respectively, illustrating a further embodiment of my invention.
Fig. 18 is a section with parts omitted taken on the line 18—18 of Fig. 17 showing an adjustable operative element of the mechanism of Figs. 16 and 17.

Figs. 16 to 18, inclusive, illustrate another embodiment indicator, which differs principally from that shown in Figs. 14 and 15 in that the bimetallic material providing a pair of relatively compensating thermostat elements 24'' and 23'' comprise only one convolution, which is joined by an intermediate substantially V-shaped loop 25'', which is stiffened longitudinally of the thermostats by bending it longitudinally, as shown at 80 and 91, so that lateral warping in this part of the thermostat will not occur to any appreciable degree. The hand 43 is preferably soldered as shown at 92 to the free end of the compensating thermostat portion 23''.

The heating element 27' and the adjustment screw 89' substantially correspond to the corresponding elements of Fig. 15. A support for the thermostatic elements of Figs. 16 to 18, inclusive, is provided by a plate 93, arcuately slotted at 94 providing an upstanding flange 95 to which the fixed end 96 of the thermostat element 24'' is affixed, preferably by soldering.

An adjustment screw 97 projected through the slot 94 into a supporting base 98 is effective to retain the unitary element comprising the plate 93, the thermostatic elements 24'' and 23'' and the hand 43'' in a given rotative position of adjustment wherein the hand 43'' takes a given position relative to the dial scale upon a given electrical energization imparted to its heating element 27''.

Figure 19:
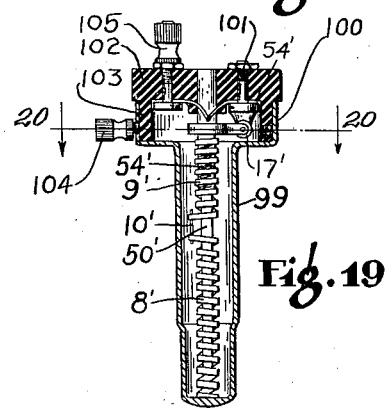
Fig. 19 is a longitudinal medial sectional view of a controlling apparatus which is another embodiment of my invention.
Figure 20:
Fig. 20 is a section taken along the line 20—20 of Fig. 19.

Referring now to the embodiment of the controller shown in Figs. 19 and 20, this embodiment is provided with elements generally corresponding to those of the embodiment of Figs. 7 to 11, inclusive, with the following exceptions. For the tube comprising stepped sections 1, 2, and 3, a sheet metal tube 99 is provided to the end wall of which the fixed end of the bi-metallic helix 8' is affixed, the tube 99 terminating in an enlarged cup portion 100 forming a part of the casing for the elements consisting of the movable contact 17' and the fixed contact 56. The fixed contact is carried on a post 54' secured by a stem 101 to an inverted cup-shaped element 102 of insulating material, a reduced portion of whose tubular lateral walls 103 is telescoped snugly within the lateral walls of the cup-shaped end 100 of the tube 99.

Besides the thermostatic helix 8', an electrically heated helix 9', shorter in length and longitudinally aligned relative thereto, is provided as in the foregoing embodiment referred to, and a preferably helical heating element 54' of resistance wire carried on a rod 50' is telescoped within the helix 9'. The two helices 8' and 9' are joined at their adjacent ends by a yoke 10' in the form of a wire rod. As in the foregoing case, the two helices are wound in opposition. The rod 50' is rigidly fixed within a central bore of the insulating cover cap 102. The cover cap 102 is bodily rotatable to rotatably adjust the fixed contact 56' for engagement with the thermostatically movable contact 17'. A set screw 104 through the lateral wall of the cup shaped end of the tube 99 holds the insulating cover cap 102 in any desired adjusted position. The electrical heating element is joined by its two terminal circuit conductors to the fixed contact 54' and an electrical terminal element 105 consisting of a screw projected through the end wall of the cap 102 and a binding post nut disposed on the exterior side of the cap.

The device of Figs. 19 and 20 may be projected into any suitable opening in a wall of a fluid containing casing, or the entire device exposed to fluids, such as air, the temperature of which is adapted to be indicated by a remotely disposed indicator, such as any of those herein shown connected in electrical serial circuit with the controller of Figs. 19 and 20, together with the source of current, as shown in Fig. 11.

Having thus described my invention in various embodiment apparatuses, I am aware that numerous and extensive departures may be made from the apparatuses herein illustrated and described, but without departing from the spirit of my invention.

I claim:

1. An electrothermal indicator comprising a pair of substantially longitudinally aligned helices of bi-metallic material, joined together by an end of each, a support, an indicator element, the other end of one of said helices being secured to said support and the other end of the second helix being secured to said indicator element and an electrical heating element telescoped within one of said helices extending longitudinally thereof and being supported coaxially thereof and communicating heat through intervening air space to the convolutions thereof, the other helix compensating the electrically heated helix for changes of ambient temperatures and a shield interposed transversely between adjacent convolutions of the helices to obstruct the flow of heated air from the electrical heating element to the compensating helix, said heating element being supported by opposed portions of said shield and said support.

2. In an electrical indicator comprising a coil of bi-metallic material having a fixed end and a free end, an indicator element supported by the free end and an electrical heating element extending longitudinally within the coil and imparting heat through the intervening air space thereto to operate said indicator element, and means supporting said heating element for adjusting its length relative to that of the said associated coil.

3. In an electrical indicator comprising a spiral of bi-metallic material having a fixed end and a free end, an indicator element supported by the free end and an electrical heating element extending longitudinally within the spiral and imparting heat through the intervening space thereto to operate said indicator element, and support means for said heating element adapted to relatively adjust the length of the heating element and its associated spiral portion.

4. In an electrical indicator comprising a spiral of bi-metallic material having a fixed end and a free end, an indicator element supported by the free end and an electrical heating element extending longitudinally within the spiral and imparting heat through the intervening space thereto to operate said indicator element, and means supporting said heating element for adjusting its length relative to the said associated spiral, said adjusting means comprising a screwthreaded support and an element of the casing carrying said support in relative screwthreaded relation.

5. An electrical indicator comprising spaced coils of bi-metallic material, an end of one of said coils being fixed, the coils being intermediately joined and the end of the other coil being free, an electrical heating element associated only with the coil having the fixed end and imparting heat to said coil, the coils being adapted to move in opposite directions responsive to thermal changes, an indicating element secured to the said free coil end whereby the heat imparted to the heating element may be indicated, and means for adjusting the effective length of said heating element to relatively alter the heating effect on its associated coil.

6. An electrical indicator comprising an element having portions movable in opposite directions responsive to thermal changes, one end of said element being fixed to a support and the opposite end being freely movable, an indicating element affixed to said free end, electrical heating means associated with one of said portions, means substantially shielding the other portion from the heating effect of the heating means, means for varying the thermal effect of the heating means on its associated element portion for a given current value and said portions being movable substantially the same amount for equal thermal changes whereby the portion associated with the heating means is compensated for ambient temperature variation by the other portion.

7. An electrothermal indicator comprising a pair of substantially longitudinally aligned helices of bi-metallic material, joined together by an end of each, a support, an indicator element, the other end of one of said helices being secured to said support and the other end of the second helix being secured to said indicator element and an electrical heating element disposed in heat exchanging relation to one of said helices, the other helix compensating the electrically heated helix for changes of ambient temperatures, and a shield interposed transversely between adjacent convolutions of the helices to obstruct the flow of heated air from the electrical heating element to the compensating helix, said heating element being supported by opposed portions of said shield and said support.

8. In an electrical indicator comprising a coil of bi-metallic material having a fixed end and a free end, an indicator element supported by the free end and an electrical heating element so disposed as to be in heat exchanging relation to said coil to operate said indicator element, and means supporting said heating element for adjusting its length relative to that of the said associated coil.

9. In an electrical indicator comprising a spiral of bi-metallic material having a fixed end and a free end, an indicator element supported by the free end and an electrical heating element disposed in heat exchanging relation to said spiral to operate said indicator element, and support means for said heating element adapted to relatively adjust the length of the heating element and its associated spiral portion.

10. In an electrical indicator comprising a spiral of bi-metallic material having a fixed end and a free end, an indicator element supported by the free end and an electrical heating element disposed in heat exchanging relation to said spiral and means supporting said heating element for adjusting its length relative to the said associated spiral, said adjusting means comprising a screwthreaded support and an element of the casing carrying said support in relative screwthreaded relation.

THEODORE J. SMULSKI.